United States Patent [19]

Nakamura et al.

[11] 4,083,056
[45] Apr. 4, 1978

[54] FOCUS DETECTING DEVICE FOR SINGLE-LENS REFLEX CAMERAS

[75] Inventors: Kazuo Nakamura, Asaka; Katsuhiko Miyata, Tsurugashima; Seijiro Tokutomi, Tokyo, all of Japan

[73] Assignee: Asahi Kogaku Kogyo Kabushiki Kaisha, Tokyo, Japan

[21] Appl. No.: 717,821

[22] Filed: Aug. 26, 1976

[30] Foreign Application Priority Data

Sep. 9, 1975 Japan .................. 50-109114
Sep. 26, 1975 Japan .................. 50-116786
Sep. 27, 1975 Japan .................. 50-132258

[51] Int. Cl.² ................................ G03B 7/08
[52] U.S. Cl. .................... 354/25; 354/31;
354/53; 354/60 E; 354/60 L; 354/201; 250/201
[58] Field of Search .......... 354/25, 31, 53, 54,
354/55, 56, 60 R, 60 E, 60 L, 195, 199, 200, 201,
289; 355/55, 56, 57, 58, 59, 60, 61, 62, 63;
350/46; 352/140; 250/209, 204, 201; 328/146,
148, 149, 150

[56] References Cited

U.S. PATENT DOCUMENTS

| | | | |
|---|---|---|---|
| 3,274,914 | 9/1966 | Biedermann et al. | 354/25 |
| 3,733,989 | 5/1973 | Wick et al. | 354/25 |
| 3,762,294 | 10/1973 | Kosaka et al. | 354/25 |
| 3,827,064 | 7/1974 | Kiyohara et al. | 354/25 |
| 3,860,935 | 1/1975 | Stauffer | 354/25 |
| 3,938,894 | 2/1976 | Nanba | 354/25 X |
| 4,047,187 | 9/1977 | Mashimo et al. | 354/25 |

*Primary Examiner*—Richard A. Wintercorn
*Assistant Examiner*—William B. Perkey
*Attorney, Agent, or Firm*—Sughrue, Rothwell, Mion, Zinn and Macpeak

[57] ABSTRACT

In a single lens reflex camera a focus detecting device is provided to identify or control the in-focus condition of a lens. The detecting device operates on the same principle as that used in visual focusing, namely the bringing together of a split image or the observation of the clarity of an image or both. A group of photo-electric light detecting elements is positioned to receive a part of the object's image, which part corresponds to that watched by the photographer in determining an in-focus condition. For split image focusing the group is divided into two lines of elements located adjacent to and on opposite sides of the line splitting the image. Each line of elements effectively measures the spatial light intensity impinging thereon. When the spatial light intensity detected by both lines are the same, an in-focus condition is detected. For image clarity focusing the adjacent elements of a line of photo electric elements are connected so as to subtractively combine their photo current outputs. Thus a maximum output is achieved when the image has maximum clarity. A combination of both techniques is particularly suitable for providing increased accuracy of detection.

11 Claims, 13 Drawing Figures

$n = 2m-1$ ($m=1,2,3\cdots$)

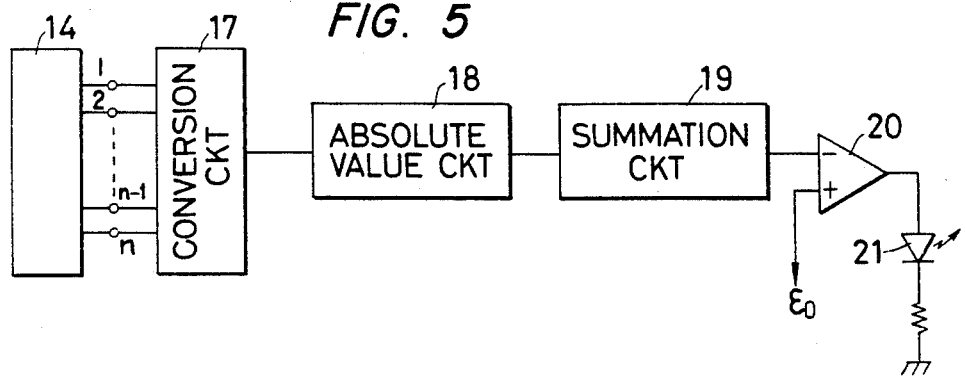
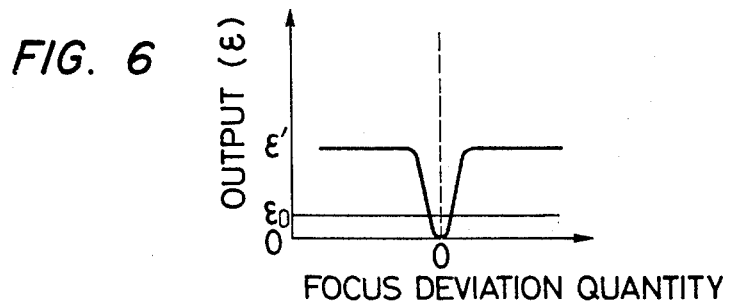

FOCUS DETECTING DEVICE FOR SINGLE-LENS REFLEX CAMERAS

BACKGROUND OF THE INVENTION

This invention relates to a focus detecting device for a single-lens reflex camera.

In general, in a single-lens reflex camera with a detachably mounted photographing lens, the accuracy of focusing depends on the photographer's ability to visually, accurately determine an in-focus condition, and on the environmental conditions such as brightness of the object to be photographed. Accordingly, with a reflex camera of this type, it is considerably difficult for beginners, or persons not familiar with the operation of the camera to precisely focus the camera on the object. Focusing is especially difficult in the case when a dark object is photographed, or the lens is stopped down, or in the case when an object is moving at a sufficiently high speed so that the photographer cannot determine whether or not the object's image is brought into focus.

A number of focus detecting devices utilizing electro optical effects have been proposed recently to overcome such difficulties. However, most of the focus detecting devices suffer from the following disadvantages. They are too large and too intricate and in view of their principle of operation they are liable to give a result different from a decision made by the photographer.

SUMMARY OF THE INVENTION

In this invention, in one embodiment focus detection is carried out based on the principle that a split image of an object created by the effect of wedge type prisms merges into a single image when the object is brought into focus. In another embodiment it is based on the principle that contrast between adjacent spot locations in the object's image is greatest when the image is in focus. The above-described drawbacks accompanying the conventional focus detecting devices can be overcome by the provision of the focus detecting device according to this invention. The focus detecting device of this invention has no mechanically vibrating parts, and is scarcely affected by the vibration of the camera, thereby presenting a high accuracy in bringing an object into focus.

One embodiment of the device according to the present invention utilizes the conventional focusing optics such that the photographer's eye and the device can be used in aid of one another to determine the proper focusing point. In particular the split image optics not only transmits the split image to the finder optics for viewing by the photographer, but sends the same split image to an electro-optical detecting means. The latter means is arranged so that a first and second bank of electro-optical detectors are placed on opposite sides of the line dividing the split image. The detectors are connected to provide a comparison of the spatial light intensity on both sides of said line and to provide a stimulus, such as light or sound, to the photographer when the comparison indicates identity or near identity. The output can also be used to control automatic focusing.

In another embodiment, one or two lines of photoelectric detecting elements are positioned to receive the object's image. The elements are interconnected so that each adjacent pair produces a difference current whose magnitude is a measure of the light intensity difference between adjacent spots (i.e. contrast). The individual difference currents are combined to provide an output which becomes maximum when the image is in focus.

BRIEF DESCRIPTION OF THE DRAWINGS

FIG. 5 is a block diagram illustrating a focus detection process unit.

FIG. 6 is a graphical representation indicating the relationships between focus deviation quantity and focus detection output.

FIG. 8 is a block diagram illustrating a focus detecting process unit.

FIGS. 9A and 9B are graphical representations indicating the relationships between focus deviation quantity and focus detection output.

DETAILED DESCRIPTION OF THE DRAWINGS

Figure 1A:
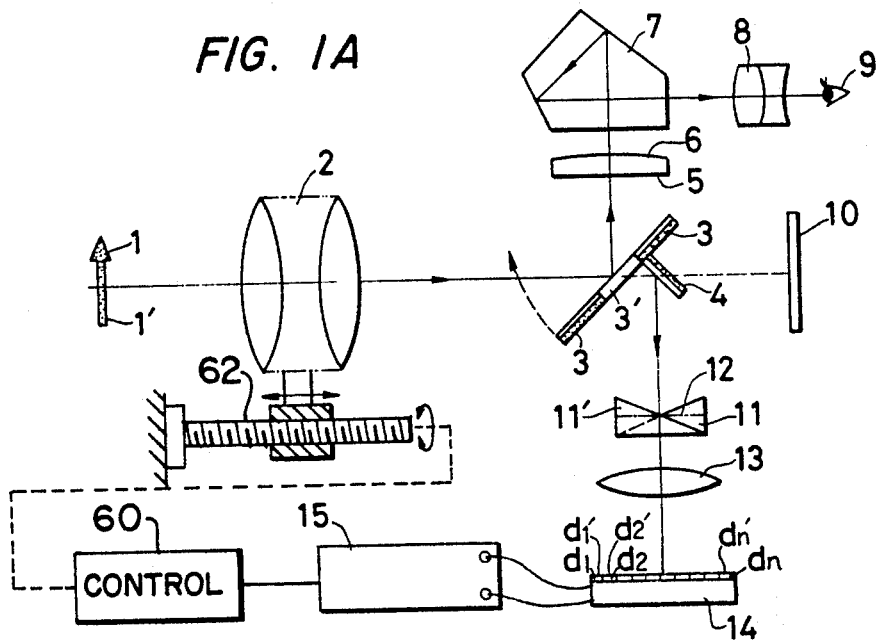
FIGS. 1A and 1B are explanatory diagrams illustrating the arrangements of two examples of this invention.

FIG. 1A is an explanatory diagram illustrating the optical arrangement of a single-lens reflex camera including a focus detecting device according to the invention, which includes: an object 1 to be photographed; a lens group 2 forming the photographing optical system; a total reflection mirror 3 having a half mirror 3' provided at its central portion; a total reflection mirror 4; a focus plate 5; a condenser lens 6; a pentaprism 7; and an eye piece 8. A photographer's eye is indicated at 9. The single-lens reflex camera further includes: A film 10; wedge type prisms 11 and 11' sloped in opposite directions; a lens 13 for focussing the image of the object onto a photo-electrical conversion element group 14 comprising minute photo-electrical conversion elements $d_1, d_2, d_3 \ldots d_n$, and $d_1', d_2', d_3' \ldots d_n'$; and a focus detection process unit 15 operating to process the outputs of the photo-electrical conversion element group 14; a suitable control unit 60 and a lead screw 62 for controlling movement of lens 2 in a manner well-known in the art. The line 12 between the prisms 11 and 11' is the horizontal center line and represents the line splitting the image into first and second image parts, e.g. upper and lower, or right and left. The position indicated by line 12 is optically equivalent to the position of the film 10.

Figure 1B:
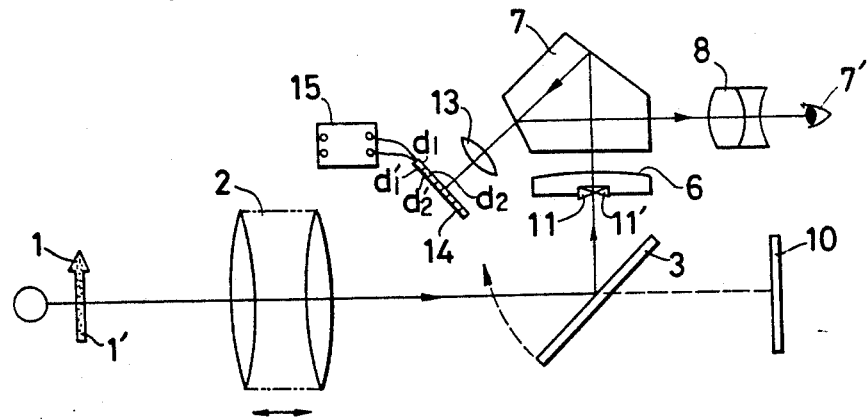

FIG. 1B is identical to FIG. 1A except for the location of certain elements and other differences which are apparent. The wedge shaped prisms 11 and 11' are placed at a central portion of the focusing plate 6 and therefore the mirror 3 may be a simple totally reflecting mirror. With this arrangement, which is conventional, insofar as elements 3, 6, 11, 11', 7 and 8 are concerned, the photographer can see a split image produced by the wedge type prisms. The back side of the pentaprism 7 is partially transmissive and the image light passing therethrough is focussed onto a group 14 of photo-electric detecting elements. The group 14 and process means 15 are the same as those in FIG. 1A.

Figure 2:
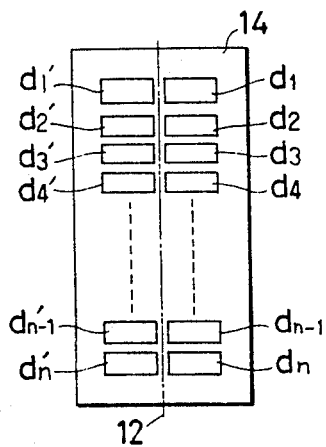
FIG. 2 is a plan view showing the arrangement of a group of photo-electrical conversion elements.

FIG. 2 is a diagram illustrating the positions of the photo-electrical conversion elements of group 14. The minute photo-electrical conversion elements $d_1$ and $d_1'$, $d_2$ and $d_2'$ ... $d_n$ and $d_n'$ are confronted or paired with each other by positioning them on opposite sides of the center line 12. The electrical characteristics and the light receiving areas of the elements are the same.

Figure 3A:
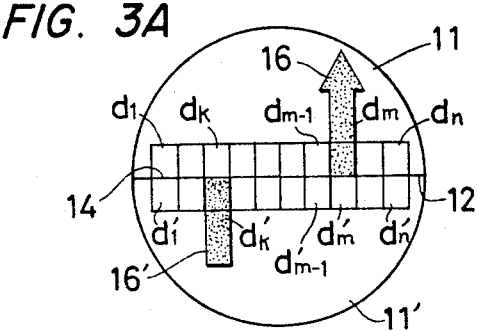
FIG. 3A is a diagram illustrating the image of an object on the photo-electrical conversion element group when the object's image is out of focus.
Figure 3B:
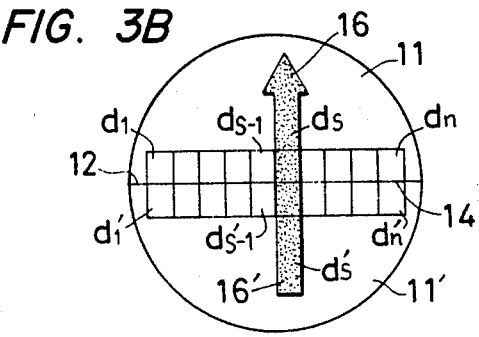
FIG. 3B is a diagram illustrating the image of an object on the photo-electrical conversion element group when the object's image is in focus.

The optical detectors are arranged so that the split image formed by wedge type prisms 11, 11' fall thereon with the upper image falling on one group of optical detectors and the lower image falling on the other group. The line separating the upper and lower images falls between said two groups. The groups are positioned very close to said line so that when the object's image is correctly focussed and the split image becomes one, the spatial intensity detected by the first group is substantially identical to the spatial intensity of the second group. As used herein, the spatial intensity may be thought of as a curve of optical intensity versus linear distance. In the case of discrete optical detectors, the effective "curve" will be in steps along the line from $d_1$ to $d_n$ and from $d_1'$ to $d_n'$. When these curves are equal, or equal within a predetermined limit, an in-focus condition is assumed to exist. FIG. 3 illustrates the relationships between split image formed by the wedge type prisms 11 and 11' and the photo-electrical conversion element group 14. More specifically, FIG. 3A shows the image of the object on the photo-electrical conversion element group 14 in the case when the object's image is not brought into focus; while FIG. 3B shows the image of the object on the element group 14 in the case when the object's image is brought into focus. In the figures, reference numerals 16 and 16' designate the upper half of the object's image and the lower half of the object's image, respectively. It should be noted that the upper and lower halves 1 and 1' of the object correspond to the upper half image 16 and the lower half image 16', respectively.

Figure 4:
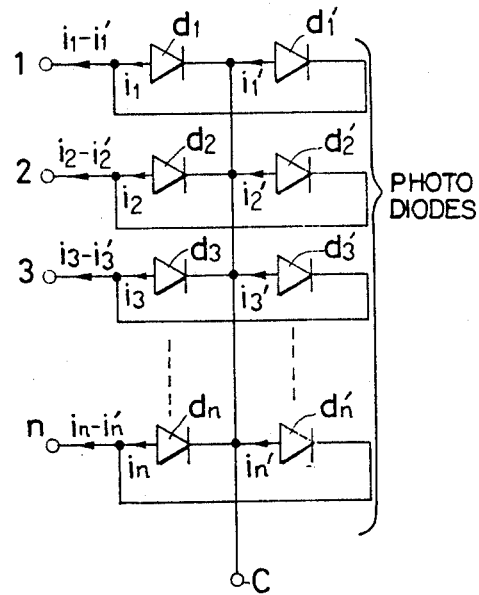
FIG. 4 is a connection diagram of minute photo-electrical conversion elements.

A connection diagram of the photo-electrical conversion element group 14 is shown in FIG. 4, wherein the reference characters $i_1, i_2 \ldots i_n$ and $i_1', i_2' \ldots i_n'$ designate output currents proportional to incident light quantities applied to the minute photo-electrical conversion elements $d_1, d_2 \ldots d_n$, and $d_1', d_2' \ldots d_n'$, respectively. In the example of FIG. 4 the photo-electrical elements are photodiodes.

FIG. 5 is a block diagram illustrating the focus detection process unit 15, which comprises: a parallel-input series-output exchange circuit 17 for receiving the outputs of the photo-electrical element group 14 in a parallel mode and producing its outputs in a series mode; an absolute value circuit 18; an adder 19; a comparator 20, and a luminous element such as a light emission diode 21.

FIG. 6 indicates variations at the negative input terminal of the comparator 20 shown in FIG. 5. In this connection, the value $\epsilon_a$ at the positive terminal of the comparator 20 shown in FIG. 5 is also indicated in FIG. 6 by the line at the level $\epsilon_c$.

The operation of the single-lens reflex camera according to this invention will now be described with reference to FIGS. 1 through 6.

The image of the object 1 and 1' is reflected by the total reflection mirror 4 after passing through the half mirror 3' in the central portion of the total reflection mirror 3 in FIG. 1A, or is deflected by totally reflective mirror 3 in FIG. 1B, and is focussed in the vicinity of the two wedge type prisms 11 and 11' sloped in the opposite directions and having a common horizontal center line 12 at a position equivalent to the position of the film 10. The image of the object is divided into two parts, the object upper and lower half images 16 and 16', which are focussed on the photo-electrical conversion element group 14 comprising a pair of minute photo-electrical conversion element groups. The photo-electrical conversion element group 14 and the horizontal center line 12, as shown in FIG. 2, are coincident with the center of the minute photo-electrical conversion elements. Therefore, when the lens group 2 forming the photographing optical system is at a position such that the image of the object 1 and 1' is not focussed on the horizontal center line 12, the upper half image 16 and the lower half image 16' do not meet, but instead are separated along the horizontal center line 12 (coincident with the center line of the photo-electrical conversion element group 14) by the effects of the two wedge type prisms 11 and 11' and the focussing lens 13, as shown in FIG. 3A. On the other hand, in the case when the image of the object is focussed on the horizontal center line 12 shown in FIG. 1, the upper half image and the lower half image, as shown in FIG. 3B, are aligned with each other interposing the horizontal center line 12 therebetween.

Now, a method in which the image of the object thus optically split into two parts is electrically detected thereby to carry out the focus detection operation, will be described.

If in the case where the light receiving areas of the minute photo-electrical conversion elements $d_1$ through $d_n$ and $d_1'$ through $d_n'$ of the photo-electrical conversion element group 14 are sufficiently small in a direction perpendicular to the horizontal center line 12, and if the upper half image 16 and the lower half image 16' are aligned with each other interposing the horizontal center line 12, it may be considered that the incident light quantity applied to one of the minute photo-electrical conversion element groups is equal to that applied to the other.

Furthermore, if the minute photo-electrical conversion elememts are paired and the elements of each pair are connected mutually in opposite polarity and in parallel, or in such a manner that, as shown in FIG. 4, the anode of the element $d_1$ is connected to the cathode of the element $d_1'$, the anode of the element $d_2$ is connected to the cathode of the element $d_2', \ldots$, and the anode of the element $d_n$ is connected to the cathode of the element $d_n'$, output differences $i_1-i_1', i_1-i_2', i_3-i_3', \ldots$, and $i_n-i_n'$ between the minute photo-electrical conversion elements are obtained between terminals 1 and C, 2 and C, 3 and C, ... and $n$ and C. In the case of FIG. 3A where the object upper half image 16 and the object lower half image 16' are not aligned with each other, the output of the minute photo-electrical conversion element $d_K$ is different from that of the minute photo-electrical conversion element $d_K'$, and also the output of the element $d_m$ is different from that of the element $d_m'$ (where it is assumed that $l \leq K$, and $m \leq n$, and that the illumination intensities of the photo-electrical conversion element group on one side of the horizontal center line 12 are equal to those of the corresponding photo-electrical conversion element group on the other side of the horizontal center line 12). In this case, if it is assumed that the sum of the absolute values of outputs obtained at the anode terminals 1, 2, 3, ... n in FIG. 4 is represented by ε; then $$\epsilon = \sum_{q=1}^{n} |i_q - i_q'| = |i_K - i_K'| + |i_m - i_m'| > 0.$$

On the other hand, in the case of FIG. 3B, where the object upper half image 16 and the object lower half image 16' are aligned on the horizontal center line 12 shown in FIG. 1 (that is, the image of the object is brought into focus), the difference between the outputs of the minute photo-electrical conversion elements $d_S$ and $d_S'$ where the upper half image 16 and the lower half image 16' are focussed is zero. Accordingly, the value of the above-described ε is:

$$\epsilon = \sum_{q=1}^{n} |i_q - i_q'| = 0.$$

Thus, when the object's image is in focus, the output ε becomes minimum or zero.

Reference numeral 15 in FIG. 1 is intended to designate the process unit which operates to detect the above-described $$\epsilon \left( = \sum_{q=1}^{n} |i_q - i_q'| \right)$$

thereby to provide an indication at the time the object's image is in focus.

Referring to FIG. 5, the process unit 15 shown in FIG. 1 will be described in detail. The outputs of the conversion elenent group 14 connected as shown in FIG. 4 are applied in parallel to the parallel-input series output conversion circuit 17, the outputs of which are applied to the absolute value circuit 18 in the order of $i_1$-$i_1'$, $i_2$-$i_2'$, ..., $i_n$-$i_n'$. As a result, the absolute value circuit 18 produces its outputs in the order of $|i_1-i_1'|$, $|i_2-i_2'|$, ..., $|i_n-i_n'|$. The outputs of the absolute value circuit 18 thus produced are successively introduced into the adder 19, which produces an output $$\epsilon = \sum_{q=1}^{n} |i_q - i_q'|.$$

This output ε is compared with a reference value $\epsilon_o$ in the comparator 20. When $\epsilon \leq \epsilon_o$, a display element 21 such as a light emission diode or a loudspeaker (not shown) is operated to inform the photographer of the in-focus condition of the object's image.

FIG. 6 indicates the relationships between the output ε and the focus deviation quantity, i.e. the deviation of the lens 1 from the in-focus position indicated at point 0 on the abscissa. When the focus deviation quantity is zero (0), that is, the object's image is brought into focus, the output ε becomes zero (0); while in the other cases the object upper half image 16 and the object lower half image 16' are set apart from each other on the horizontal center line 12 and the output becomes ε'(>0). It goes without saying that variation in the vicinity of the point indicating the in-focus condition depends on the magnitude of the light receiving area of each minute photo-electrical conversion element in a direction parallel to the horizontal center line 12, and therefore the resolution is increased as the light receiving area is decreased. Furthermore, the distance between the adjacent minute photo-electrical conversion elements should be as small as possible.

The reference value $\epsilon_o$ is a factor for determining the allowance of the focus deviation quantity. Ideally, it should be zero (0) because the detection accuracy is increased as it is decreased; however, the range of determining the in-focus condition is decreased as the reference value is decreased, and a detection of an in-focus condition becomes difficult. In this connection, if a servo-motor or the like, provided for carrying out the focus adjustment by moving a part of the lens group 2, is controlled with the aid of the output ε, an automatic focus detection device can be obtained.

Referring back to FIG. 1, the system shown is also capable of permitting a focus detection method which depends upon visual observance by the photographer.

In FIG. 1A the image of the object 1 and 1', passing through the lens group 2 forming the photographing optical system, is reflected by the total reflection mirror 3 and by the half mirror 3' provided in the central part of the total reflection mirror 3, and is focussed on the focus plate 5 at a position optically equivalent to the position of the film 10. The image of the object thus focussed is delivered to the photographer's eye 9 through the condenser lens 6, the pentaprism 7, and the eye piece 8, so that it is determined by the photographer's eye 9 whether or not the image is satisfactory. According to his determination, the lens group 2 forming the photographing optical system is moved in the directions of the arrows to precisely obtain focusing of the image.

In FIG. 1B, on the other hand, the photographer sees the split image in the finder optics and can focus the object on the camera by visually observing the merging of the two parts of the split image.

Figure 7:
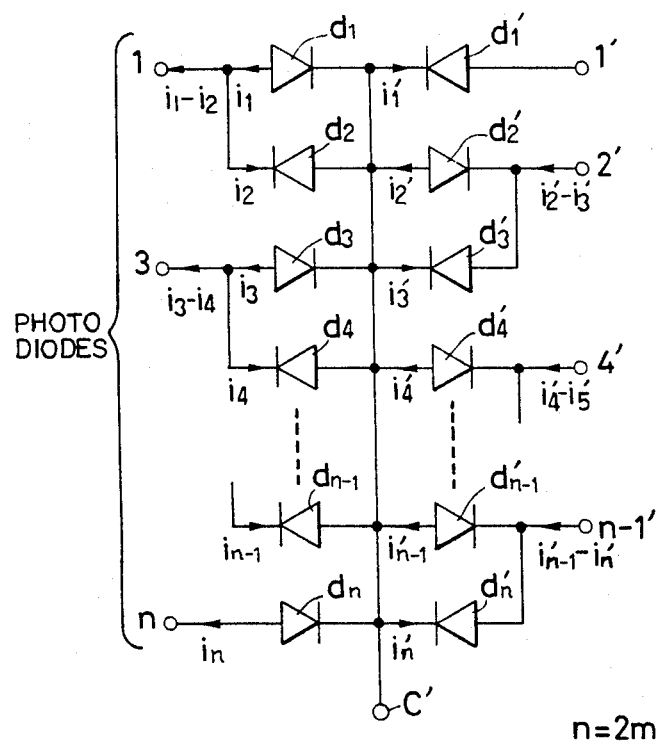
FIG. 7 is another connection diagram of minute photo-electrical conversion elements.

FIG. 7 is a connection diagram illustrating another embodiment of the above-described photo-electrical conversion element group 14, in which the adjacent minute photo-electrical conversion elements are connected mutually in opposite direction and in parallel between terminals 1, 3, 5 ... n, 1', 2', 4', 6'. . . n-1' and a common terminal C so that output differences $i_1$-$i_2$, $i_3$-$i_4$. . . $i_{n-2}$-$i_{n-1}$, $i_2'$-$i_3'$, $i_4'$-$i_5'$, . . . $i_{n-1}'$-$i_n'$ between the concerned minute photo-electrical conversion elements are provided across the respective terminals and the common terminal C.

With respect to the object upper half image 16 and the object lower half image 16' in FIGS. 3A and 3B, the image in FIG. 3B where the image is brought into focus is clear or sharp when compared with that in FIG. 3A. Therefore, the output difference $i_{s-1}$-$i_s$, or $i_s$-$i_{s+1}$, or $i_{s-1}'$-$i_s'$, or $i_s'$-$i_{s+1}'$ between the adjacent minute photo-electrical conversion elements $d_{s-1}$ and $d_s$, or $d_s$ and $d_{s+1}$ or $d_{s-1}'$ and $d_s'$, or $d_s'$ and $d_{s+1}'$ in the case of FIG. 3B is greater than the output difference $i_{m-1}$-$i_m$, or $i_m$-$i_{m+1}$, or $i_{k-1}'$-$i_k'$, or $i_k'$-$i_{k+1}'$ between the adjacent minute photo-electrical conversion elements $d_{m-1}$ and $d_m$, or $d_m$ and $d_{m+1}$, or $d_{k-1}'$ and $d_k'$, or $d_k'$ and $d_{k+1}'$ in the case of FIG. 3A. In consequence, with respect to an ordinary image, if the sum of the absolute values of the outputs is represented by V, and the photo-electrical conversion elements are arranged in accordance with the arrangement shown in FIG. 7; the value V indicated below becomes maximum when the image is in-focus:

$$V = \sum_{q=1}^{\frac{(n-1)}{2}} |i_{2q-1} - i_{2q}|^P + \sum_{q=1}^{\frac{(n-1)}{2}} |i_{2q} - i_{2q+1}|^P,$$

where (P = 1, 2, 3 ...). As is apparent from $$V = \sum_{q=1}^{\frac{(n-1)}{2}} |i_{2q-1} - i_{2q}|^P$$

$$\text{or } V = \sum_{q=1}^{\frac{(n-1)}{2}} |i_{2q} - i_{2q+1}|^P,$$

the elements on one side only of the photo-electrical conversion element group 14 may be utilized. In this connection, when the p-th power of the absolute value is obtained, the greater the value of p, the sharper the curve in the vicinity of the point where the focussing is obtained.

The process means 15 (FIG. 1) which can be used with the connection of FIG. 7 is shown in FIG. 8. The difference currents $i_1$-$i_2$, $i_3$-$i_4$... $i_{n-2}$-$i_{n-1}$, $i_2'$-$i_3'$, $i_4'$-$i_5'$... $i_{n-1}'$-$i_n'$ are applied from the photo-electrical conversion element group 14 to a parallel-input series-output conversion circuit 17 and then to an absolute value circuit 38. The latter circuits are identical to circuits 17 and 18 respectively in FIG. 5. The output from the absolute value circuit is applied to a power factor circuit 24 which raises each input to a power p by multiplying same by itself p-1 times. The outputs therefrom are summed by summation circuit 39 which is identical to circuit 19 of FIG. 5. The output therefrom, which is:

$$V = \sum_{q=1}^{\frac{(n-1)}{2}} |i_{2q-1} - i_{2q}|^P + \sum_{q=1}^{\frac{(n-l)}{2}} |i_{2q} - i_{2q+1}|^P$$

is compared with a predetermined upper limit $\epsilon_o'$ in comparator 20. When the value V equals or exceeds $\epsilon_o'$ a luminescence diode 21 or a speaker (not shown) is energized.

As pointed out above, both lines $d_1$-$d_n$ and $d_1'$-$d_n'$ need not be used in this embodiment. Furthermore, this embodiment does not require a split image and thus is operable even without the wedge type prisms 11 and 11'. The power p may be made equal to 1, in which case the powering circuit may be dispensed with.

Figure 10:
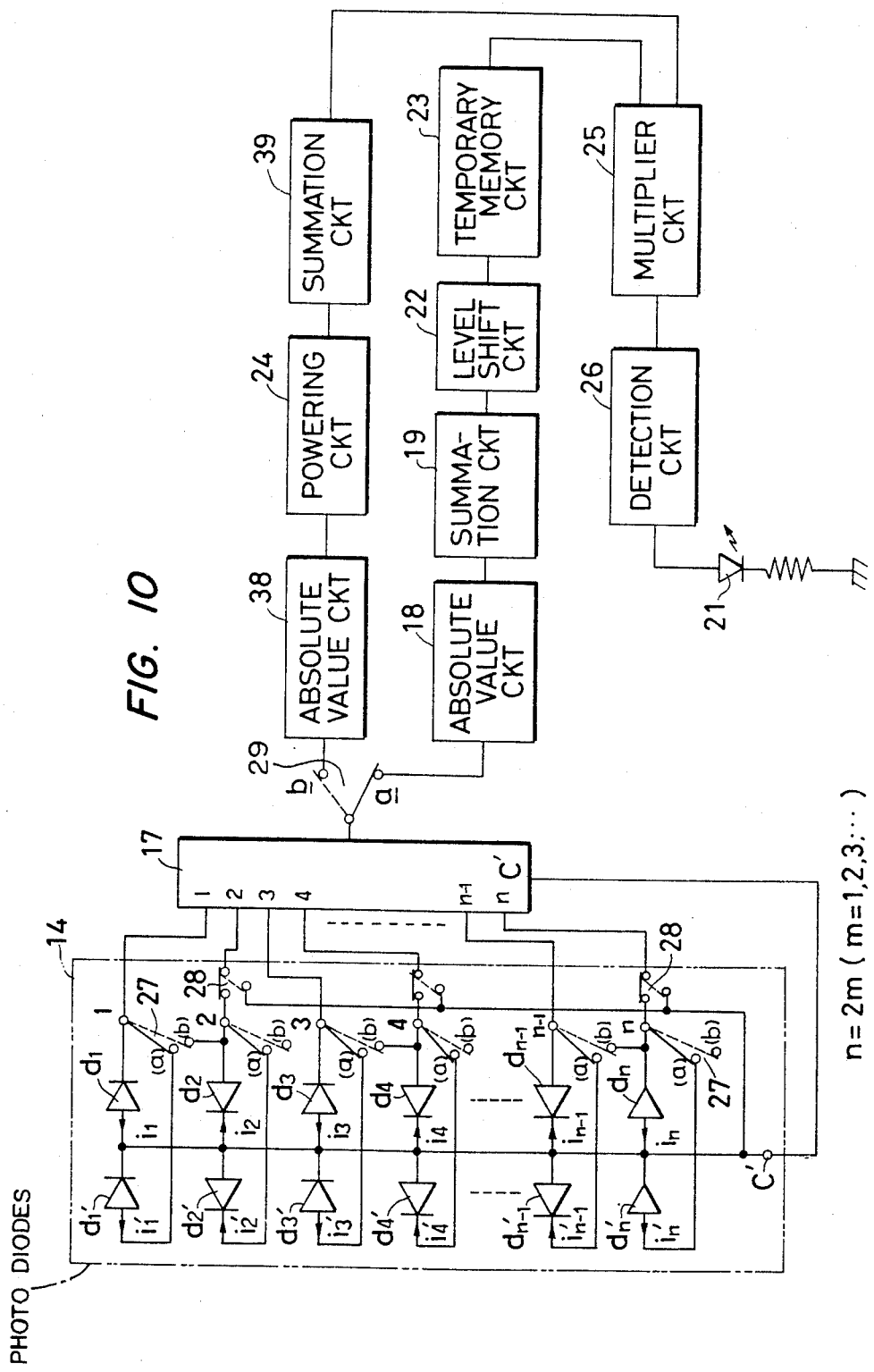
FIG. 10 is another block diagram illustrating a focus detection process unit.

FIG. 10 is a block diagram corresponding to the focus detection process unit 15 shown in FIG. 1. In this embodiment, switch groups 27 and 28 and a switch 29 are controlled so that their armatures are set at their contacts a or b simultaneously. When the armatures are at the contacts a, the group 14 is connected exactly as in FIG. 4 and the processor is the same as that of FIG. 5. More specifically the output differences of the minute photo-electrical conversion elements paired on opposite sides of the center line 12 are applied to the parallel-input series-output conversion circuit 17, and the output $$\sum_{q=1}^{n} |i_q - i_q'|$$

is obtained through the absolute value circuit 18 and the adder 19. The output of adder 19 is applied to an inversion and shift-up circuit 22, as a result of which the circuit 22 produces an output $$V_o - \sum_{q=1}^{n} |i_q - i_q'| > 0.$$

This is stored in a temporary memory circuit 23. In the circuit 22, as shown in FIG. 9A, the output of the adder 19 indicated by the line (a) is inverted and is shifted up to an appropriate value $V_o$ (>0), indicated by the line (b), thereby to convert the minimum value to the maximum value.

Upon storage of the output in the temporary memory circuit 23, the armatures of the switches are tripped over to their contacts b. In this case the elements of group 14 are connected in a manner similar to that shown in FIG. 7. In FIG. 8, however, it will be noted that only one of the two identical groups of elements is used under the conditions mentioned. Thus, for example, the currents $d_1$-$d_2$, $d_3$-$d_4$, $d_5$-$d_6$, etc. are obtained, whereas the currents $d_1'$-$d_2'$, $d_3'$-$d_4'$, $d_5'$-$d_6'$, etc. are not obtained. However, as pointed out previously in connection with FIG. 7, one or both groups of elements can be used with no change in function.

More specifically, when the armatures of the switch groups 27 and 28 are tripped over to the contacts b, the output differences of the adjacent minute photo-electrical conversion elements are applied to the parallel-input series-output conversion circuit 17, and an output $$\sum_{q=1}^{\frac{n}{2}} |i_{2q-1} - i_{2q}|^P$$

is obtained with the aid of the absolute value circuit 38, a powering circuit 24, and the adder 39 on the side of the contact b with the switch 29 operated. P is a constant determined by the powering circuit 24, or 1, 2, 3, ... This output and the output stored in the temporary memory circuit 23 are combined by a multiplier circuit 25, the output of which is applied to a maximum value detection circuit 26 to determine the maximum value.

When the maximum value is obtained or the image is brought into focus, a light emitting element 21 such as a light emission diode is operated to inform the photographer of an in-focus condition. Thus, the output can be utilized for automatic focus detection.

Needless to say, when p is selected to be 1, the provision of powering circuit 24 is unnecessary; and when p is an even number, the provision of the absolute value circuit 38 is unnecessary. In addition, the absolute value circuit and the adder can be used in common for the operations on the contacts a and b.

In FIG. 9B, reference character (b) designates the output of the temporary memory circuit 23, (c) the output of the adder on the side of the contact b when the armatures of the switches have been tripped to the contacts b, and (d) the output of the multiplier circuit 25. As is clear from the figure, the combination of the two focus detection methods will provide an excellent result, because the output becomes sharper in the vicinity of the point where the focusing is obtained, which leads to improvement of the detection accuracy.

In this embodiment, the combination of the two detection methods has been described; however, the two detection methods can be individually practiced in such a manner that first a coarse focus detection is carried out, and then a fine focus detection is carried out. If the focusing method utilizing the connection as shown in FIG. 7 is carried out individually, the wedge shaped prisms 11 are not required.

Thus, as was described above, in this invention, a point where two parts obtained by optically splitting an object's image are aligned is detected by use of a group of paired minute photo-electrical conversion elements, as a result of which the accuracy in focus detection is considerably improved; and in addition since a minimum value 0 is detected when the object's image is brought into focus, the detection is scarcely affected by the vibration of the camera, and it is possible to readily manufacture a focus detecting device which is simple in construction and has no movable parts. Furthermore, it should be noted that on the basis of the fact that the focus detecting methods on different principles can be practiced with one and the same group of photo-electrical conversion elements, a focus detecting device of a single-lens reflex camera according to this invention is high in accuracy, simple in construction, and small in size.

What is claimed is:

1. In a single lens reflex camera of the type having a reflecting mirror for directing light towards a finder optical system during pre-photography operation, a focusing plate positioned to receive said reflected light, a pentaprism positioned to receive light passing through said focusing plate, and a finder optical system positioned to receive light reflected from the surfaces of said pentaprism, whereby said camera can be focused by a photographer adjusting a lens system and observing an object's image through the finder optical system, the improvement characterized by, a group of light detecting elements positioned in said camera to receive said object's image, said group of light detecting elements comprising a plurality of photodiodes interconnected to have the photo currents from adjacent ones combined subtractively providing a plurality of discrete contrast indicating difference currents, whereby a maximum of the sum of the absolute values of said contrast currents occurs when an in-focus condition is reached, processing means connected to said group of light detecting elements for detecting a sum of the absolute values, raised to a preselected power, of said difference currents and for providing an indication for a photographer when said sum is above a predetermined level.

2. A single lens reflex camera as claimed in claim 1 wherein said processing means comprises, a parallel-input series-output circuit means connected to said group of light detecting elements for providing said difference currents in sequence at an output thereof, absolute value circuit means connected to said parallel-input series-output circuit means for providing at its output the absolute values of each of said difference currents, power circuit means connected to said absolute value circuit means for raising each said absolute value current difference to a predetermined power p, and summation means connected to said power circuit means for summing the outputs from said power circuit.

3. A single lens reflex camera as claimed in claim 2 wherein said processing means further comprises comparator means connected to said summing circuit means for providing an output in-focus indicating signal when the sum provided by said summation circuit means exceeds a predetermined value.

4. A single lens reflex camera as claimed in claim 3 further comprising a motorized mechanism adapted to move a lens system for focusing said camera, and means responsive to said in-focus output signal for stopping said motorized movement of said lens.

5. A single lens reflex camera as claimed in claim 3 further comprising a noise making device responsive to said in-focus output signal for audibly signalling the detection of an in-focus condition.

6. A single lens reflex camera as claimed in claim 3 further comprising a lamp positioned to provide light in said finder optical system when energized, said light being connected to said comparison means to be energized by said in-focus output signal.

7. A single lens reflex camera as claimed in claim 3 wherein said mirror has a portion thereof which is partially transparent and an extension thereof which reflects the light passing through said transparent portion, said group of light detecting elements being positioned to receive the light reflected by said extension.

8. A single lens reflex camera as claimed in claim 3 wherein said pentaprism has a partially transparent face, opposite to the face thereof which transmits said image to said finder optics, for transmitting the object's image to said group of light detecting elements.

9. A single lens reflex camera of the type having a mirror for reflecting light from an object after passing through a lens system, a focusing plate to receive said reflected light, a pentaprism, and finder optical means for permitting viewing of the image of said object by a photographer whereby visual determination of focusing is possible, and a pair of wedge shaped prisms located at a position optically equivalent to a film frame position in said camera, for splitting said object's image into a first half image and a second half image separated by a center line, the improvement characterized by; a group of light detecting elements positioned in said camera to receive light corresponding to at least said split image portion, said light detecting elements being positioned in two groups positioned adjacent to and on opposite sides of said center line, and processing means connected to said group of light detecting means for providing an in-focus indicia when the spatial light intensity determined by both said groups are equal within a predetermined limit, said group of light detecting elements comprises a first group of photodiodes, a second substantially identical group of photodiodes, each photodiode in said first group being paired with a photodiode in said second group, said first group positioned in a line adjacent to and on one side of said center line, said second group positioned in a line adjacent to and on the other side of said center line, each said pair being electrically interconnected so that the photo optical currents generated thereby are combined subtractively to provide a pair difference current, further comprising switching means for disconnecting the aforesaid interconnection of said photodiodes whereby paired diodes are on opposite sides of said center line, and for reconnecting at least one group of said diodes to interconnect adjacent ones of said photodiodes in pairs to subtractively combine the photocurrents therefrom into contrast indicating difference currents, whereby a maximum of the sum of the absolute value of said currents occurs when an in-focus condition is reached.

10. A single lens reflex camera as claimed in claim 9 further comprising a second processing means for detecting a sum of the absolute values, raised to a preselected power, of said difference currents, and second switching means for selectively connecting said first and second processing means to said group of light detecting elements.

11. A single lens reflex camera as claimed in claim 10 further comprising storage means for storing the output of one of said first and second processing means, multiplier means for multiplying said stored output and the output of said other processing means.

* * * * *